US009622424B2

(12) United States Patent
Martin

(10) Patent No.: US 9,622,424 B2
(45) Date of Patent: Apr. 18, 2017

(54) WAVELENGTH EMITTING ELECTRONIC DEVICE

(71) Applicant: Elizabeth A Martin, Portland, OR (US)

(72) Inventor: Elizabeth A Martin, Portland, OR (US)

( * ) Notice: Subject to any disclaimer, the term of this patent is extended or adjusted under 35 U.S.C. 154(b) by 0 days.

(21) Appl. No.: 15/255,021

(22) Filed: Sep. 1, 2016

(65) Prior Publication Data

US 2016/0366834 A1    Dec. 22, 2016

Related U.S. Application Data

(60) Provisional application No. 62/333,275, filed on May 9, 2016.

(51) Int. Cl.
| | |
|---|---|
| *A01G 7/04* | (2006.01) |
| *F21V 21/00* | (2006.01) |
| *F21V 17/10* | (2006.01) |
| *F21V 23/02* | (2006.01) |
| *F21V 3/04* | (2006.01) |
| *F21Y 115/10* | (2016.01) |
| *F21Y 115/15* | (2016.01) |

(52) U.S. Cl.
CPC ............ *A01G 7/045* (2013.01); *F21V 3/0418* (2013.01); *F21V 17/10* (2013.01); *F21V 21/00* (2013.01); *F21V 23/02* (2013.01); *F21Y 2115/10* (2016.08); *F21Y 2115/15* (2016.08)

(58) Field of Classification Search
CPC ................................ A01G 7/045; A01G 9/20
See application file for complete search history.

(56) References Cited

U.S. PATENT DOCUMENTS

| | | | | |
|---|---|---|---|---|
| 2009/0288340 | A1* | 11/2009 | Hess ........................ | A01G 9/26 47/58.1 LS |
| 2011/0115385 | A1* | 5/2011 | Waumans ............... | A01G 7/045 315/152 |
| 2011/0183368 | A1* | 7/2011 | Chapman ............... | A01G 7/045 435/29 |
| 2012/0043907 | A1* | 2/2012 | Lu .......................... | A01G 7/045 315/287 |

* cited by examiner

*Primary Examiner* — Karabi Guharay
(74) *Attorney, Agent, or Firm* — Barry Choobin; Patent 360

(57) ABSTRACT

A wavelength emitting electronic device for enhancing growth of a plurality of plants includes a supporting frame member, at least one printed circuit board (PCB), and an optically transmittive material. The supporting frame member includes a first surface and a second surface. The PCB includes an array of light sources. The PCB is detachably attached to the second surface of the supporting frame. The array of light sources receives electrical signals from a circuit rectification module power source. Each light source of the array of light sources emits light of predetermined wavelengths. The optically transmittive material is fixedly attached to the supporting frame member for transmitting the light emitted by the array of light sources to the plants for enhancing growth of plants.

6 Claims, 9 Drawing Sheets

| WAVELENGTH | 670NM | 465NM | 485NM |
|---|---|---|---|
| | | | |
| FORWARD CURRENT | 350mA | 350mA | 350mA |
| FORWARD VOLTAGE | 2.1V | 3.1V | 3.1V |
| POWER RATING | 3.5W | 3W | 3W |
| LED SIZE | 3.45mmX3.45mmX2mm | 3.45mmX3.45mmX2.26mm | 3.45mmX3.45mmX2.26mm |
| MAX OPERATING TEMPERATURE | 150°C | 150°C | 150°C |
| VIEWING ANGLE | 130 DEG | 135 DEG | 135 DEG |
| | | | |

FIG. 8

| PLANT NAME | SCIENTIFIC NAME |
|---|---|
| TRUE LAVENDER | *LAVANDULA ANGUSTIFOLIA* |
| ROSEA PINK LAVENDER | *LAVANDULA ANGUSTIFOLIA* |
| SERRANO CHILI PEPPER | *CAPSICUM ANNUUM* |
| RED CHERRY TOMATO | *SOLANUM LYCOPERSICUM CERASIFORME* |
| SWEET 100 TOMATO | *LYCOPERSICON ESCULENTUM* |
| YELLOW PEAR TOMATO | *SOLANUM LYCOPERSICUM* |
| ACE 55 TOMATO | *SOLANUM LYCOPERSICUM* |
| LETTUCE SAMPLER | *LACTUCA SATIVA* |
| CANNABIS | *CANNABIS* |
| JOLLY GREEN HYBRID CUCUMBER | *CUCUMIS SATIVUS* |
| SUMMER SQUASH ZUCCHINI | *CUCURBITA PEPO* |
| EARLY SUMMER CROOKNECK SQUASH | *CUCURBITA PEPO* |
| PORCELAIN DOLL PUMPKIN | *CUCURBITA MAXIMA* |
| JARRAHDALE BLUE PUMPKIN | *CUCURBITA MAXIMA* |
| PETUNIA PRISM SUNDAE MIX | *PETUNIA EXSERTA* |
| ARTICHOKE GREEN GLOBE | *CYNARA CARDUNCULUS VAR SCYLOMUS* |
| BLUE SHRIMP PRIDE OF GIBRALTAR | *CERINTHE MAJOR* |
| KING OF BLACK CARNATION | *DIANTHUS CARYOPHYLLUS* |
| CHIANTI HYBRID SUNFLOWER | *HELIANTHUS ANNUUS* |
| BLUEBONNET | *LUPINUS TEXENSIS* |
| BELL PEPPER | *CAPSICUM ANNUUM* |
| HOLLYHOCK | *ALCEA SETOSA* |
| MARIGOLD FRENCH VANILLA HYBRID | *CALENDULA FRENCH VANILLA HYBRID* |
| ALYSSUM CARPET OF SNOW | *LOBULARIA MARITIMA* |
| PANSY SPRINGTIME MIX | *VIOLA TRICOLOR VAR. HORTENSIS* |
| SWEET BASIL | *OCIMUM BASILICUM* |
| CILANTRO | *CORIANDRUM SATIVUM* |
| FOUR O' CLOCK MARVEL OF PERU | *MIRABILIS JALAPA* |
| NEON ROSE COCKSCOMB | *CELOSIA ARGENTEA* |

FIG. 9

WAVELENGTH EMITTING ELECTRONIC DEVICE

FIELD OF THE INVENTION

The present invention disclosed herein specifically relates to light emitting apparatuses for enhancing growth of plant life through use of wavelength manipulation. This invention herein to be referred to as a wavelength emitting electronic device. More particularly, the invention disclosed herein relates to a wavelength emitting electronic device for manipulating plant growth using restricted spectral output wavelengths to target chemical excitation with chlorophyll molecules in chloroplast.

BACKGROUND

The effects of light on the growth of plants have been studied over the years. Several studies have shown that by manipulating the wavelengths and duration of light directed at a selection of plant, their growth can be enhanced or reduced. Tissue culture, used widely in plant science, is the growth of plant tissues or cells within a controlled environment. Traditionally, tissue culture researchers' and horticultural industries have used artificial light sources for production. These light sources include, for example, high-pressure sodium lamp (HPS), metal halide lamp (MHL), incandescent lamp, etc. However, the abovementioned light sources are energy intensive, which means the power outputs of some of these lamps range from about 400 W to 1100 W. In commercial indoor horticultural applications, several of these lamps may be required to direct light over a large area. The power requirements and the costs incurred for conventional light sources are thus high. With energy being a point of concern for most commercial entities, a light source, which provides the necessary light with minimal power and cost requirements, is required.

Furthermore, photoreceptors, which are complex light-sensing systems within plants, respond to energy packets carried at specific wavelength signals measured in nanometers. These complex systems can convert light energy into kinetic energy. Phytochromes, cryptochromes, and phototropins are three well-defined photoreceptors. The arriving light energy signal induces chemical excitation and the transformation leads to the beginning of the process of photosynthesis. Wavelengths or wavebands ranging from about 600 nm to about 700 nm are particularly efficient for inducing verifiable changes in phytochromes, consequently modifying their photochemical kinetics, nuclear/cytoplasmic partitioning, ability to phosphorylate substrates, and physical interactions with downstream components for photomorphogenesis. Cryptochromes are active within the ranges of about 300 nm to about 500 nm wavelength bands and most notably between the 465 nm and 485 nm wavelength band. The photomorphogenesis effect activates the cycle within the photoreceptors thus propagating the life cycle. Additionally, the wavelength bands ranging from about 550 nm to about 580 nm have little or no effect on photosynthetic activity of plants. Existing light sources direct light from all wavelength bands without providing options for selectively supplying only wavelengths, which enhance and allow for manipulation within the life cycles of plants. A light source, which is capable of selectively supplying wavelengths of light that enhance the growth of all higher plant life, is required.

Hence, there is a long felt but unresolved need for a light emitting apparatus, which provides the necessary power spectral density (PSD) of Photosynthetic Active Radiation (PAR) while achieving sub-minimal power requirements to operate. Furthermore, there is a need for a light emitting apparatus, which is capable of selectively supplying wavelengths of light that not only enhance growth of plant life but is also used to manipulate all stages of plant life development with minimal power requirements to operate.

SUMMARY OF THE INVENTION

This summary is provided to introduce a selection of concepts in a simplified form that are further disclosed in the detailed description of the invention. This summary is not intended to identify key or essential inventive concepts of the claimed subject matter, nor is it intended for determining the scope of the claimed subject matter.

The invention disclosed herein addresses the abovementioned need for a light emitting apparatus, which provides the necessary power spectral density (PSD) of Photosynthetic Active Radiation (PAR) with minimal power consumption requirements. Furthermore, the invention addresses the need for a light emitting apparatus, which is capable of selectively supplying wavelengths of light that enhance growth and allow for controlled manipulation of all higher forms of plant life. The wavelength emitting electronic device, designed for enhancing growth of a plurality of plants disclosed herein, includes a supporting frame member, at least one printed circuit board, and an optically transmittive material. The supporting frame member includes a first surface and a second surface. The printed circuit board includes an array of light sources. In an embodiment, the printed circuit board is detachably attached to the second surface of the supporting frame. The array of light sources receives electrical signals from a class 2 circuit rectification module power source. Each light source of the array of light sources only emits light of predetermined wavelengths. The optically transmittive material is fixedly attached to the supporting frame member for transmitting light emitted by the array of light sources to plants for enhancing growth and controlled manipulation.

BRIEF DESCRIPTION OF THE DRAWINGS

The foregoing summary, as well as the following detailed description of the invention, is better understood when read in conjunction with the appended drawings. For the purpose of illustrating the invention, exemplary constructions of the invention are shown in the drawings. However, the invention is not limited to the specific methods and structures disclosed herein. The description of a method step or a structure referenced by a numeral in a drawing is applicable to the description of that method step or structure shown by that same numeral in any subsequent drawing herein.

FIG. 8 exemplarily illustrates a table showing characteristics of the different wavelengths used in a wavelength emitting electronic device.

FIG. 9 exemplarily illustrates a table showing plants that have been successfully grown using a wavelength emitting electronic device.

DETAILED DESCRIPTION OF THE INVENTION

Figure 1:
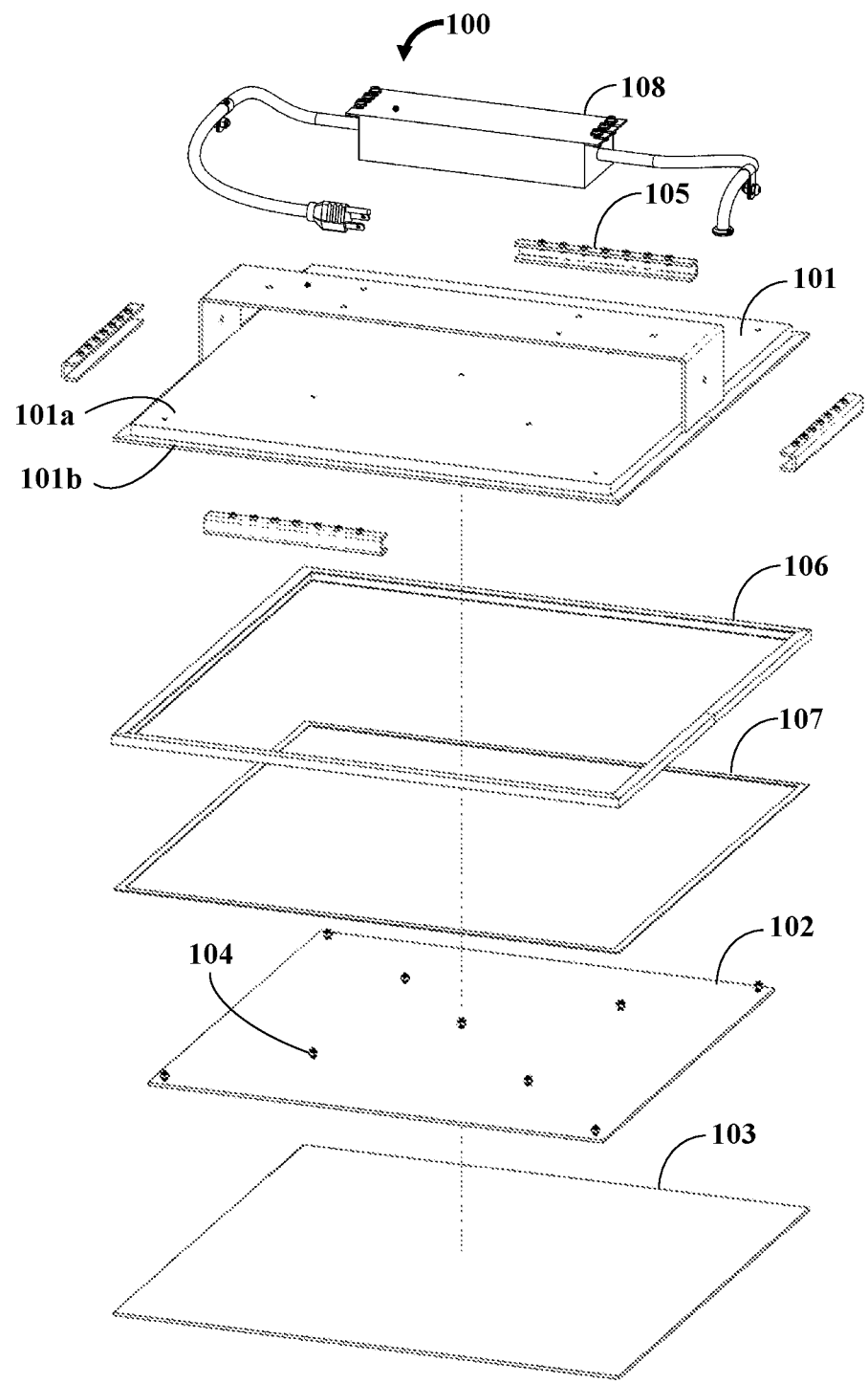
FIG. 1 exemplarily illustrates an exploded view of a wavelength emitting electronic device.

FIG. 1 exemplarily illustrates an exploded view of a wavelength emitting electronic device 100. The wavelength emitting electronic device 100 is an optoelectronic device that creates photonic effects. As used herein, "optoelectronic devices" refer to devices or circuits that comprise both electrical and optical functions, i.e., a thin-film semiconductor device. Optoelectronic devices function as electrical-to-optical transducers or optical-to-electrical transducers. As used herein, "photonics" refers to the particle properties of light, wavelength identification, the potential of creating signal processing device technologies using photons distribution and/or manipulation, the practical application of optics and uses in the marketplace, and an analogy to electronics. The wavelength emitting electronic device 100 disclosed herein, employs both, former and the latter. Optoelectronics is based on the quantum mechanical effects of light on electronic materials, especially semiconductors. Devices properly designed can be used with organism cell development as a stable source of energy to preform photophosphorylation. Duration and potential energy availability is restricted to the designated components within the circuit, for example: an individual emitter with a monochromatic (wavelength at 485 nm).

In an embodiment, the wavelength emitting electronic device 100 rectifies standard wall electricity into light of different wavelengths, which then is provided to plants in a controlled environment for both enhancing growth of plants and plant cycle manipulation. The wavelength emitting electronic device 100 provides an energy efficient solution to indoor horticulturalists by providing a simplistic formula utilizing three wavebands of electromagnetic energy. In the invention disclosed herein, the wavelength emitting electronic device 100 comprises a supporting frame member 101, at least one printed circuit board 102 (PCB), and an optically transmittive material 103. In an embodiment, the supporting frame member 101 is made of aluminum material of about 3 mm thickness with powder-coating finish. The supporting frame member 101 supports all other components of the wavelength emitting electronic device 100. The main function of each part is to transfer heat; the wavelength emitting electronic device 100 utilizes the laws of nature to reduce heat by "thermal conduction". This is the transfer of heat through internal energy by microscopic collisions of particles and movement of electrons within a body. The microscopically colliding objects, that include molecules, atoms, and electrons, transfer disorganized microscopic kinetic and potential energy, jointly known as internal energy. Conduction takes place in all phases of matter, such as solid, liquid, gas, and plasma. The rate at which energy is conducted as heat between two bodies is a function of the temperature difference and temperature gradient between the two bodies and the properties of the conductive medium through which the heat is transferred. Heat spontaneously flows from a hotter to a colder body. For example, heat is conducted from the hotplate of an electric stove to the bottom of a saucepan in contact with it. Additional thermal transfer material helps diffuse and disperse heat between the surface of the PCB 102 and the supporting frame member 101. The supporting frame member 101 is the final stage of transferring heat from the printed circuit board 102. The printed circuit board 102 is made, for example, from aluminum, etc. In an embodiment, the supporting frame member 101 comprises a first surface 101a and a second surface 101b. 100.

In an embodiment, the external structure is, for example, a roof, a pillar, a beam of a building, etc. The printed circuit board 102 comprises an array of light sources 104; for example, light emitting diodes (LEDs), organic light emitting diodes (OLEDs), etc. An LED is a type of semiconductor diode, which emits light when activated. In an embodiment, the printed circuit board 102 is made of aluminum having a thickness of about 3 mm. In an embodiment, the array of light sources 104 comprises only LEDs, only OLEDs, or a combination of both LEDs and OLEDs. As used herein, a "printed circuit board (PCB)" refers to a board which mechanically supports and electrically connects electronic components using conductive tracks, pads, and other features etched from copper sheets laminated onto a non-conductive substrate. Electronic components, for example, capacitors, resistors, or active devices are generally soldered on the PCB. Advanced PCBs, however contain components embedded in the substrate. In an embodiment, the printed circuit board (PCB) 102 is detachably attached to the second surface 101b of the supporting frame member 101. The array of light sources 104, for example, the LEDs receive electrical signals from a class 2 circuit rectification module power source 108.

Each light source 104 of the array of light sources 104 emits light of predetermined wavelengths. In an embodiment, the predetermined wavelengths range from about 450 nm to about 700 nm. The optically transmittive material 103 is fixedly attached to the supporting frame member 101 for transmitting the light emitted by the array of light sources 104 to plants for enhancing and manipulation of growth. In an embodiment, the optically transmittive material 103 is, for example, clear tempered glass material, etc., having a thickness of about 3 mm. The optically transmittive material 103 provides protection and usability to the printed circuit board (PCB) 102 housing the light sources 104 (LED's). Furthermore, the optically transmittive material 103 is stationary and at a distance of about 1 mm from the glass lens of the light sources 104. This prevents the build-up of heat and preserves the color rendering effect of the light sources 104. The PCB 102 and the optically transmittive material 103 are detachably attached to the supporting frame member 101 of the wavelength emitting electronic device 100 using multiple clamping members 105. In an embodiment, the clamping members 105 are made of aluminum having a thickness of about 3 mm and a powder-coating finish.

The clamping members 105 stabilize and secure the optically transmittive material 103. The clamping members 105 also have very good thermal energy transferring properties. In an embodiment, the wavelength emitting electronic device 100 comprises a gasket 107, which is placed between the optically transmittive material 103 and the supporting frame member 101. The gasket 107 provides shock stability and friction reduction on the surface of the optically transmittive material 103. An outer seal 106 made from a flexible material, for example, silicone rubber, etc., is provided to suitably seal the outer edges of the optically transmittive material 103 and the supporting frame member 101. Additionally, the outer seal 106 provides shock and friction reduction. Furthermore, the outer seal 106 provides a smooth edge to the wavelength emitting electronic device 100 and prevents users from injuring himself or herself when contacting the edges of the wavelength emitting electronic device 100. The provision of light sources 104 by use of three wavelengths by the wavelength emitting electronic devices 100 enables plants to grow optimally via photomorphogenesis.

As used herein, "Photomorphogenesis" refers to any change in form or function of an organism occurring in response to changes in the light environment. Photomorphogenesis is often defined as light-regulated plant development, but there are also changes in morphology and/or cell structure and function, which occur as transient acclimatization's to a changing environment. More particularly, if this more inclusive definition is used, photomorphogenesis is a process common to organisms well beyond the plant kingdom. While there are only a few examples of photomorphogenesis in the animal kingdom, it is a common feature of development in organisms, for example, fungi, protists, bacteria, etc. As used herein, "photomorphogenesis" is the process by which plants grow and develop in response to light. A network of photoreceptors in plants, for example, phytochromes, etc., play a key role in mediating the process. Phytochrome is a pigment protein complex called a holo-protein, which is a combination of a chromophore and an apoprotein. The chromophore is an open chain tetrapyrolle called a phytochromobilin made in the plastids and has a blue-green pigment. The apoprotein is a soluble glycoprotein. The holochrome self assembles after the individual components are synthesized. For example, the protein is made by ribosomes. Phytochrome-mediated photomorphogenetic responses are characterized by the complex variety of relationships between light input and physiological outputs, for example, germination, de-etiolation, shade avoidance, circadian rhythm, flowering, etc. Photomorphogenesis is nature's way of modulating a plant's ability to harness light energy efficiently. Typically, plants derive energy for sustenance from light energy via photosynthesis. As used herein, "photosynthesis" refers to a process used by plants and other organisms to convert light energy into chemical energy that is stored and released to fuel the plant's activities.

The wavelength emitting electronic device 100 specifically interacts and creates excitation within chlorophyll molecules. Photosynthesis consists of light-dependent and light-independent reactions. Each of these reactions create several byproducts that lead to developmental characteristics within plants. The wavelength emitting electronic devices 100 focuses on creating as many excitations as possible for both photosystems (PS1) and (PS2) with three target wavelengths, for example, 465 nm, 485 nm, 670 nm. This triggers photoreceptors within absorbing pigments to create photomorphogenesis. Because the restricted light energy causes minor deficiencies, plants compensate in number of variations to reestablish equilibrium within their two photosystems. Photosynthesis occurs inside chloroplasts. Chloroplasts contain chlorophyll, a green pigment found inside the thylakoid membranes. The chlorophyll molecules are arranged in groups called photosystems. There are two types of photosystems, Photosystem I and Photosystem II. When a chlorophyll molecule absorbs light, the energy from this light raises an electron within the chlorophyll molecule to a higher energy state. The chlorophyll molecule is then said to be photo activated. An excited electron anywhere within the photosystem is passed on from one chlorophyll molecule to the next until they reach a special chlorophyll molecule at the reaction center of the photosystem. This special chlorophyll molecule then passes on the excited electron to a chain of electron carriers.

The light-dependent reactions start within Photosystem II. When the excited electron reaches the special chlorophyll molecule at the reaction center of Photosystem II, it is passed on to the chain of electron carriers. This chain of electron carriers is found within the thylakoid membrane. As this excited electron passes from one carrier to the next it releases energy. This energy is used to pump protons (hydrogen ions) across the thylakoid membrane and into the space within the thylakoids. This forms a proton gradient. The protons can travel back across the membrane, down the concentration gradient, however to do so they must pass through Adenosine Tri Phosphate (ATP) synthase. ATP synthase is located in the thylakoid membrane and it uses the energy released from the movement of protons down their concentration gradient to synthesize ATP from ADP and inorganic phosphate. The synthesis of ATP in this manner is called non-cyclic photophosphorylation (uses the energy of excited electrons from photosystem II). Photosystem I then accepts the electrons from the chain of electron carriers. These electrons replace electrons previously lost from Photosystem I. Photosystem I then absorbs light and becomes photo activated. The electrons become excited again as they are raised to a higher energy state.

These excited electrons then pass along a short chain of electron carriers and are eventually used to reduce $NADP^+$ in the stroma. $NADP^+$ accepts two excited electrons from the chain of carriers and one $H^+$ ion from the stroma to form NADPH. If the light intensity is not a limiting factor, there will usually be a shortage of $NADP^+$ as NADPH accumulates within the stroma. $NADP^+$ is needed for the normal flow of electrons in the thylakoid membranes as it is the final electron acceptor. If $NADP^+$ is not available then the normal flow of electrons is inhibited. However, there is an alternative pathway for ATP production in this case and it is called cyclic photophosphorylation. It begins with Photosystem I absorbing light and becoming photoactivated. The excited electrons from Photosystem I are then passed on to a chain of electron carriers between Photosystem I and II. These electrons travel along the chain of carriers back to Photosystem I and as they do so, they cause the pumping of protons across the thylakoid membrane and therefore create a proton gradient. As explained previously, the protons move back across the thylakoid membrane through ATP synthase and as they do so, ATP is produced. Therefore, ATP can be produced even when there is a shortage of $NADP^+$.

In addition to producing NADPH, the light dependent reactions also produce oxygen as a waste product. When the special chlorophyll molecule at the reaction center passes on the electrons to the chain of electron carriers, it becomes positively charged. With the aid of an enzyme at the reaction center, water molecules within the thylakoid space are split. Oxygen and $H^+$ ions are formed as a result and the electrons from the splitting of these water molecules are given to chlorophyll. The oxygen is then excreted as a waste product. This splitting of water molecules is called photolysis as it only occurs in the presence of light. When chlorophyll absorbs light energy, an electron gains energy and is 'excited'. The excited electron is transferred to another molecule (called a primary electron acceptor). The chlorophyll molecule is oxidized (loss of electron) and has a positive charge. Photoactivation of chlorophyll results in the splitting of water molecules and the transfer of energy to ATP and reduced nicotinamide adenine dinucleotide phosphate (NADP).

In biology, "actinic light" denotes light from solar or other sources that causes photochemical reactions such as photosynthesis in a species. As such, specific ratios of corresponding emitters are chosen based on an algorithmic equation for desired potential effect in chloroplast excitation, for example, to emit a wavelength based on a desired excitation within one or more specific targeted photoreceptors utilizing monochromatic wavelengths via light emitting diodes (LED's), organic light emitting diode (OLED's), quantum dot light emitting diode (QD-LED's), chip on board subtracts (COB), etc. The three classes of photoreceptors have been characterized from plants at the molecular level. Specific wavelengths trigger characterized chain reactions. Phytochromes perceive red and far-red light ranging between 600 nm and 750 nm. The phytochrome apoprotein contains two histidine kinase related domains (HKRD1 and HKRD2) at the carboxyl terminus and two Per-Amt-Sim domains (PAS) within the HKRD1 domain that have been shown to function as protein-protein interaction domains and small ligand response modules. Cryptochromes perceive blue and UVA light ranging between 320 nm and 500 nm. At the amino terminus is a photolyase related domain (PHR), and at the carboxyl terminus is DQXVP-acidic-STATES (DAS) motif. Phototropins also perceive blue and UVA light ranging between 320 nm and 500 nm. The phototropin apoprotein contains two chromophore-binding domains (LOV1 and LOV2) as well as a Kinase domain at the carboxyl terminus.

Plants monitor red and far-red wavelengths using the phytochrome family of photoreceptors. Phytochromes exist as a homodimer of two independently reversible subunits. Each subunit consists of a polypeptide, weighing approximately 124 kDa, covalently attached to a light-absorbing tetrapyrrole chromophore. Interactions between the chromophore and polypeptide components enable phytochrome to assume two spectrally distinct forms, for example, the Pr form and the Pfr form. The Pr form absorbs maximally in the red region of the spectrum ranging between 666 nm and 668 nm. The Pfr form absorbs maximally in the far-red region of the spectrum having a wavelength of about 730 nm. Phytochrome is synthesized in the Pr form, which is biologically inactive for most phytochrome-mediated responses. Activity is acquired upon photo-transformation to the Pfr isomer. This aspect is a key development of the spectral output of the wavelength emitting electronic device 100. The deficiencies of restricted light are mediated within the photoreceptor families, each adjacent pigment assuming its neighbor's role to help reestablish a homogeneous state.

Certain red and blue wavelengths of light are the most effective in photosynthesis because they have exactly the right amount of energy to energize, or excite chlorophyll electrons and boost them out of their orbits to a higher energy level. Other pigments, called accessory pigments, enhance the light-absorption capacity of the leaf of a plant by capturing a broader spectrum of blue and red wavelengths, along with yellow and orange wavelengths. None of the photosynthetic pigments absorb green light; as a result, green wavelengths are reflected, which is why plants appear green. Photosynthesis begins when light strikes Photosystem I pigments and excites their electrons. The energy passes rapidly from molecule to molecule until it reaches a chlorophyll molecule called P700, so named because the P700 molecule absorbs light in the red region of the spectrum at wavelengths of 700 nanometers. Until this point, only energy has moved from molecule to molecule; now electrons themselves transfer between molecules. P700 uses the energy of the excited electrons to boost its own electrons to an energy level that enables an adjoining electron acceptor molecule to capture them. The electrons are then passed down a chain of carrier molecules, called an electron transport chain.

The electrons are passed from one carrier molecule to another in a downhill direction, like individuals in bucket brigade passing water from the top of a hill to the bottom. Each electron carrier is at a lower energy level than the one before it, and the result is that electrons release energy as they move down the chain. At the end of the electron transport chain, lies the nicotineamide adenine dinucleotide ion ($NADP^+$). Using the energy released by the flow of electrons, two electrons from the electron transport chain combine with a hydrogen ion and $NADP^+$ ion to form NADPH. When P700 transfers its electrons to the electron acceptor, the P700 molecule becomes deficient in electrons. Before the P700 molecule can function again, the P700 molecule must be replenished with new electrons. The second stage of photosynthesis accomplishes this task. As in the first stage of photosynthesis, light energy activates electrons of the pigments of the second stage of photosynthesis. These pigments transfer the energy of their excited electrons to a second stage chlorophyll molecule, P680, which absorbs light best in the red region at about 680 nanometers.

Just as in the first stage of photosynthesis, energy is transferred among pigment molecules and is then directed to the P680 chlorophyll, where the energy is used to transfer electrons from P680 to its adjoining electron acceptor molecule. From the second stage electron acceptor, the electrons are passed through a different electron transport chain. As they pass along the cascade of electron carrier molecules, the electrons give up some of their energy to fuel the production of ATP, formed by the addition of one phosphorous atom to adenosine diphosphate (ADP). Eventually, the electron transport carrier molecules deliver the second stage electrons to the first stage, which uses them to maintain the flow of electrons to P700, thus restoring its function. P680 in the second stage is now electron deficient because it has donated electrons to P700 in the first stage. The water that has been absorbed by the plant roots and transported to the chloroplasts in the leaves replenishes P680 electrons. The movement of electrons in the first and the second stages, and the action of an enzyme split the water into oxygen, hydrogen ions, and electrons. The electrons from water flow to the second stage, replacing the electrons lost by P680.

Some of the hydrogen ions may be used to produce NADPH at the end of the electron transport chain. The oxygen from the water diffuses out of the chloroplast, and the oxygen is released into the atmosphere through pores in the leaf. The transfer of electrons in a systematic fashion in the first and second stages releases energy and heat slowly, thus protecting the chloroplast and cell from a harmful temperature increase. It also provides time for the plant to form NADPH and ATP. The ATP and NADPH molecules produced in the light-dependent reaction supply the chemical energy required for the light-independent reaction. The light-independent reaction is cyclic, that is, it begins with a molecule that must be regenerated at the end of the reaction in order for the process to continue. This cyclic reaction is referred to as the Calvin cycle after the American chemist Melvin Calvin who discovered it, the light-independent reactions use the electrons and hydrogen ions associated with NADPH and the phosphorous associated with ATP to produce glucose. These reactions occur in the stroma, the fluid in the chloroplast surrounding the thylakoids, and a different enzyme controls each step.

The light-independent reaction requires the presence of carbon dioxide molecules, which enter the plant through pores in the leaf, diffuse through the cell to the chloroplast, and disperse in the stroma. The light-independent reaction begins in the stroma when these carbon dioxide molecules link to sugar molecules called ribulose bisphosphate (RuBP) in a process known as carbon fixation. With the help of an enzyme, six molecules of carbon dioxide bond to six molecules of RuBP to create six new molecules. Several intermediate steps, which require ATP, NADPH, and additional enzymes, rearrange the position of the carbon, hydrogen, and oxygen atoms in these six molecules, and when the reactions are complete, one new molecule of glucose has been constructed and five molecules of ribulose bisphosphate (RuBP) have been reconstructed. This process occurs repeatedly in each chloroplast as long as carbon dioxide, ATP, and NADPH are available. The plant processes the thousands of glucose molecules produced in this reaction to produce energy in the process known as aerobic respiration. This energy is used or stored. The regenerated RuBP is used to start the Calvin cycle all over again. As P700 occurs at 700 nm or (nanometers wavelength), plants cannot use much light above this region.

The majority of a plants diet can come from one or more high Chlorophyll A and Chlorophyll B wavelengths, resulting in a wide range of diversity to its overall dietary needs throughout its life cycle. Wavelength emitting electronic devices 100 only offer chemically Photosynthetic Active Radiation (PAR) wavebands, thus ensuring the light outputted is entirely usable for photosynthesis. The chosen wavebands used on a printed circuit board 102 of a Wavelength emitting electronic device 100, constitutes something akin to what one might think of if creating a nutritional supplement chart for a bodybuilders diet, "high in the protein department." Consequently, if you adjust your habits to that of a body builder, you become a "bodybuilder." Now imagine if you could rearrange the sunshine to suite your gardening needs based on the crop you have planted that season. Wavelength emitting electronic devices 100 function with a similar effect on plants, that is, enhanced growth. As such, the wavelength emitting electronic device 100 utilizes only three individual wavebands for excitation within the aforementioned photoreceptors. About 77.78% of the spectrum interacts with Phytochromes and 22.22% interacts with Cryptochromes and Phototropins. By using this ratio, an established hierarchy prevails within the photoreceptors themselves. The photoreceptors begin mediating to minimize undesired mutations, and circumstantially optimize the signal or signals being provided. This fact is a huge benefit for growing higher plant forms in all stages of life.

This also provides a significant time reduction in the entire life cycle from seed to flowering/fruiting. The components used to produce the array of the wavelength emitting electronic device 100 are chosen by their performance values, which are provided by their respective manufacturing data sheets. However, these devices are not limited to individual parts, nor are they limited to technology of specific components, but rather by the physical dimensions of thermal absorption and heat transference materials to maintain functioning operating temperatures. In an embodiment, the array of a wavelength emitting electronic device 100 holds 108 high power LED's. The circuit is a series of six diodes and eighteen parallels. The class 2 circuit rectification module power supply 108 provides an output of 20 VDC and 9.3 amperes. The power rating to each diode is just over 500 mA after small losses through heat dissipation in the circuit. Wavelength emitting electronic devices 100 works well for the majority of plant species because chemically they provide what most species require, both chlorophyll (A) and chlorophyll (B). The wavelength emitting electronic device 100 utilizes high power light sources 104 (LEDs) with outputs of (1000 mA) individually. The chemical reactant for photosynthesis to occur not only requires the correct wavelength of the signal, but the correct potential energy as well. Energy comes in a variety of measurable ranges called signals. Each of these signals has the potential to carry out a function. Depending on the requirements, one signal may be better suited to the individual needs over another. A light emitting diode (LED) is a type of semiconductor diode, which emits light when activated. These semiconductors can achieve both high-energy potential and individual wavelength signal separation to optimize chemical energy conversion for plants from light energy.

LEDs are sophisticated semi-conductors with a small piece of material called a band-gap that electrical signal is directed across; this in turn causes a byproduct of light. The effect requires a measured amount of both voltage and amperage. Once this balance is achieved, the energy requirement to sustain this effect is reduced, allowing a percentage of initial energy to transfer forward into the general circuit. Each of the independent components can recycle part of its original signal, thus offering high efficiency and very low power consumption when designing a stable circuit. In an embodiment, the wavelength emitting electronic device 100 provides high power performance with very low power consumption. Moreover, the wavelength emitting electronic device 100 draws power from a circuit rectification power source 108 mounted on the supporting frame member 101 as exemplarily illustrated in FIG. 1. Power conversion or more accurately, signal conversion, is the act of converting electricity from what comes through a wall socket, (Alternating Current AC) to a more stable version know as (Direct Current DC). This process is called circuit rectification or poly phasing, and is a fundamental component of wavelength emitting electronic devices 100. Because this aspect is so crucial, the wavelength emitting electronic device 100 uses transformation components consisting of segregated voltage and amperage signals, isolating individual requirements to create a smoother more efficient operating circuit. The wavelength emitting electronic device 100 uses class 2 portable rectification modules 108 with output values under 24V DC. Input values are standard North American 110/220V AC.

The wavelength emitting electronic devices 100 have successfully germinated and grown a multitude of plant species as tabulated in FIG. 9. Each of the individual species grown showed similar results with timed observations in multiple areas, for example, germination, rooting, leaf growth, flowering, etc. Several mediums were used to germinate seeds, including rooting plugs and a variety of potting soils. All seeds were dry and dormant when placed into grow mediums. On average, most seeds demonstrated hypocotyl and cotyledons development within the first 70 hours, and all subjects demonstrated cotyledon visible verification within 144 hours. In an embodiment, the wavelength emitting electronic device 100 provides chemical reaction light for embryonic root development very aggressively, thus offering an alternate path in the germination of plant seeds. Apical meristems cell structures also demonstrated exaggerated speeds and structural development, which in turn allows the plant to multiply by expanding leaf development. All plants observed demonstrated a significant reduction of time between developmental stages through flowing.

Figure 2:
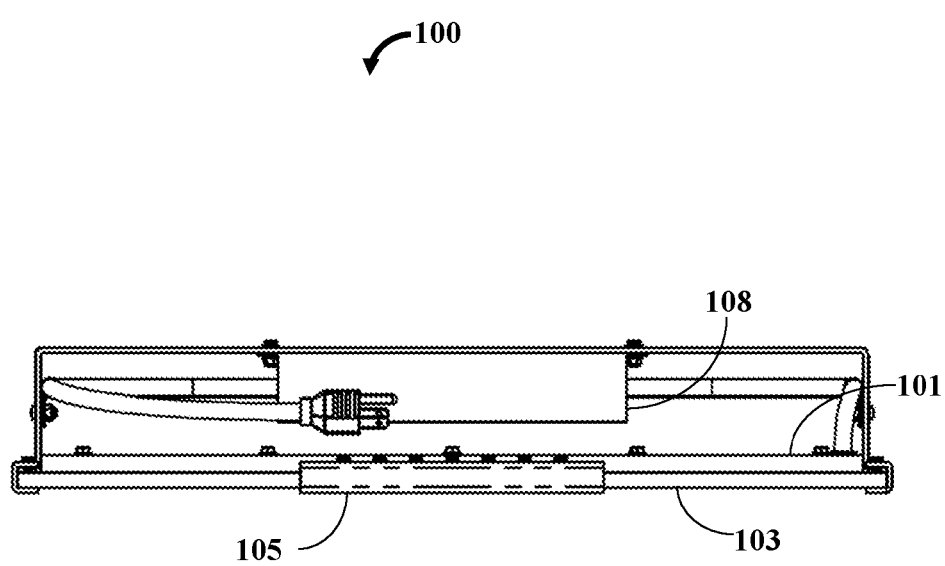
FIG. 2 exemplarily illustrates a front elevation view of a wavelength emitting electronic device.
Figure 3:
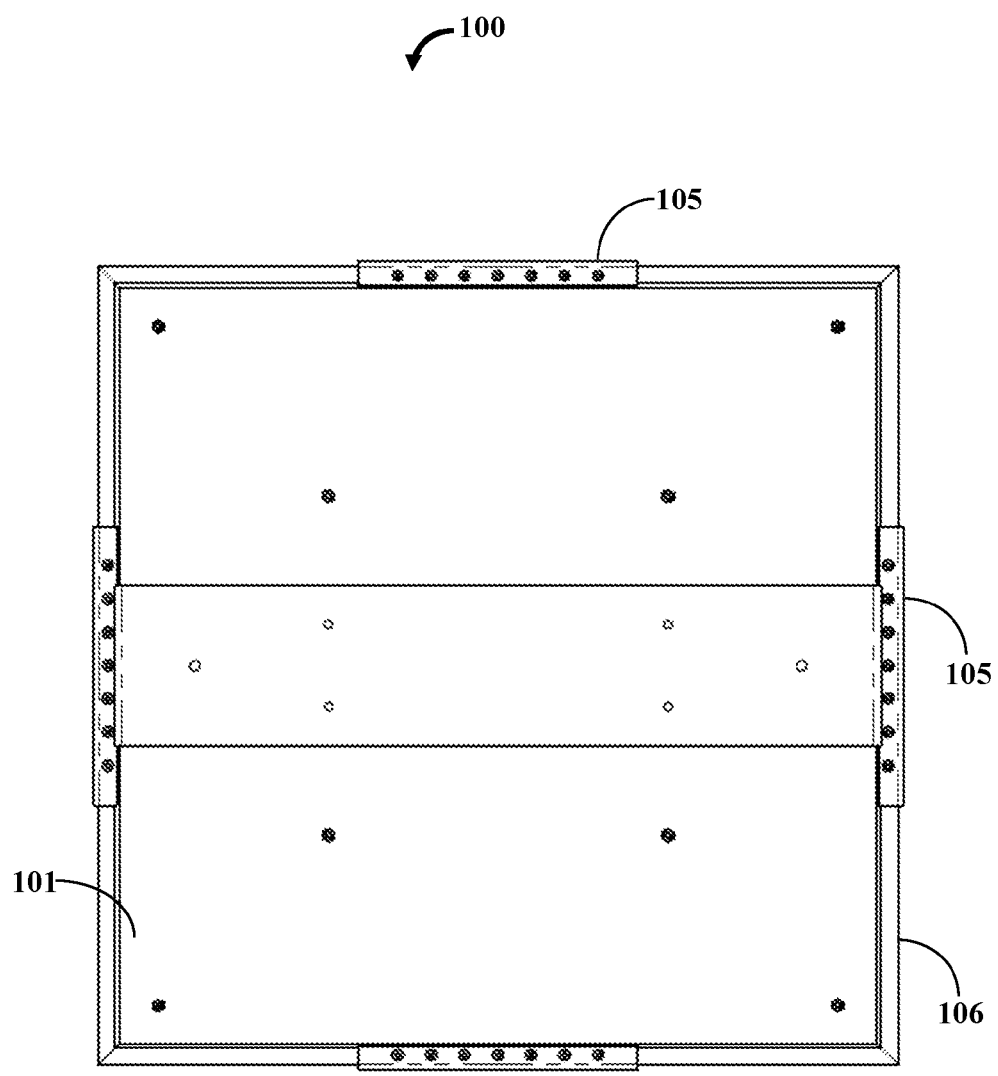
FIG. 3 exemplarily illustrates a top plan view of a wavelength emitting electronic device.

FIG. 2 exemplarily illustrates a front elevation view of a wavelength emitting electronic device 100. FIG. 3 exemplarily illustrates a top plan view of a wavelength emitting electronic device 100. In an embodiment, the wavelength emitting electronic device 100 comprises a supporting frame member 101, at least one printed circuit board 102, and an optically transmittive material 103. The optically transmittive material 103 is detachably attached to the supporting frame member 101 using multiple clamping members 105 as exemplarily illustrated in FIG. 2. The printed circuit board (PCB) 102, is housed in the space between the optically transmittive material 103 and the supporting frame member 101. A circuit rectification module power source 108 is mounted on the supporting frame member 101 as exemplarily illustrated in FIG. 2. The wavelength emitting electronic device 100 draws power from the circuit rectification module power source 108.

Figure 4:
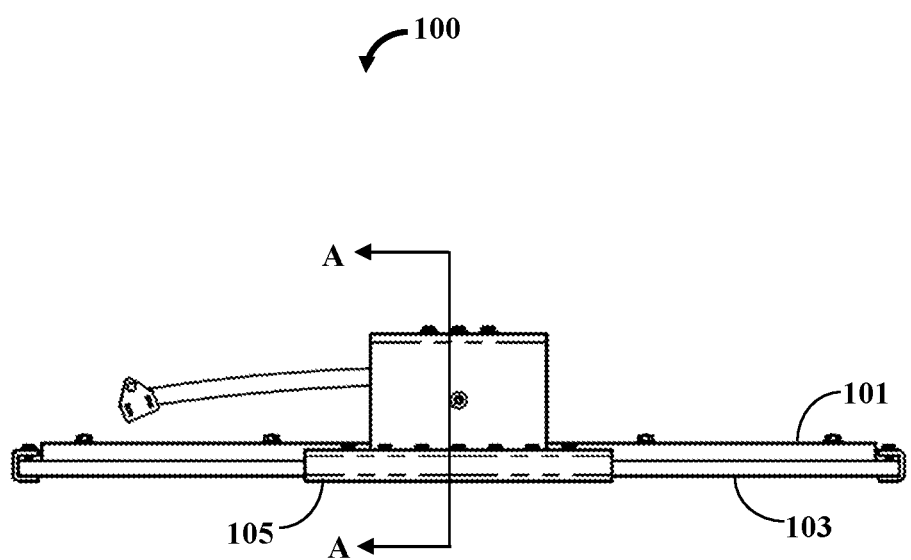
FIG. 4 exemplarily illustrates a right side elevation view of a wavelength emitting electronic device.
Figure 5:
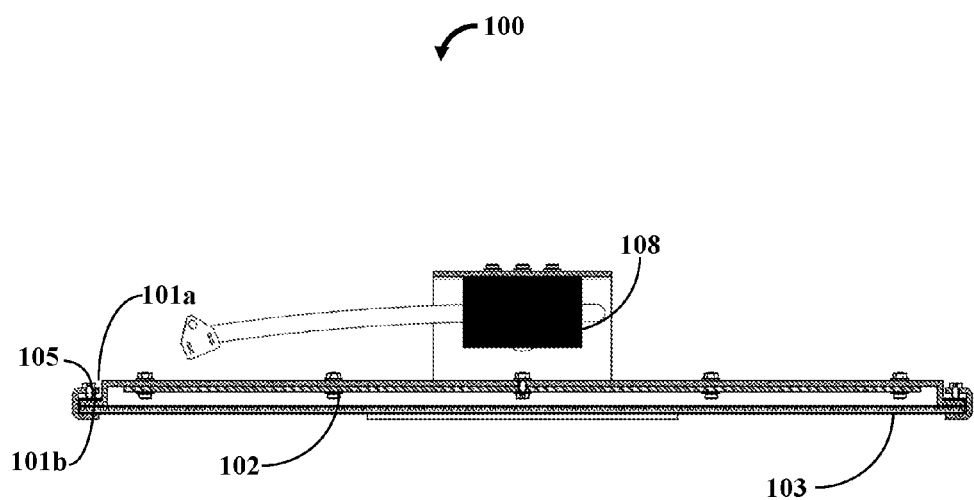
FIG. 5 exemplarily illustrates a sectional view of a wavelength emitting electronic device.

FIG. 4 exemplarily illustrates a right side elevation view of a wavelength emitting electronic device 100. FIG. 5 exemplarily illustrates a sectional view of a wavelength emitting electronic device 100 about the line A-A exemplarily illustrated in FIG. 4. In an embodiment, the wavelength emitting electronic device 100 comprises a supporting frame member 101, at least one printed circuit board (PCB) 102, and an optically transmittive material 103. The supporting frame member 101 comprises a first surface 101a and a second surface 101b. The PCB 102 is detachably attached to the second surface 101b of the supporting frame member 101. The optically transmittive material 103 is detachably attached to the supporting frame member 101 using multiple clamping members 105 as exemplarily illustrated in FIGS. 4-5. The printed circuit board (PCB) 102, is housed in the space between the optically transmittive material 103 and the supporting frame member 101. The wavelength emitting electronic device 100 draws power from a circuit rectification module power source 108 as exemplarily illustrated in FIGS. 4-5.

Figure 6:
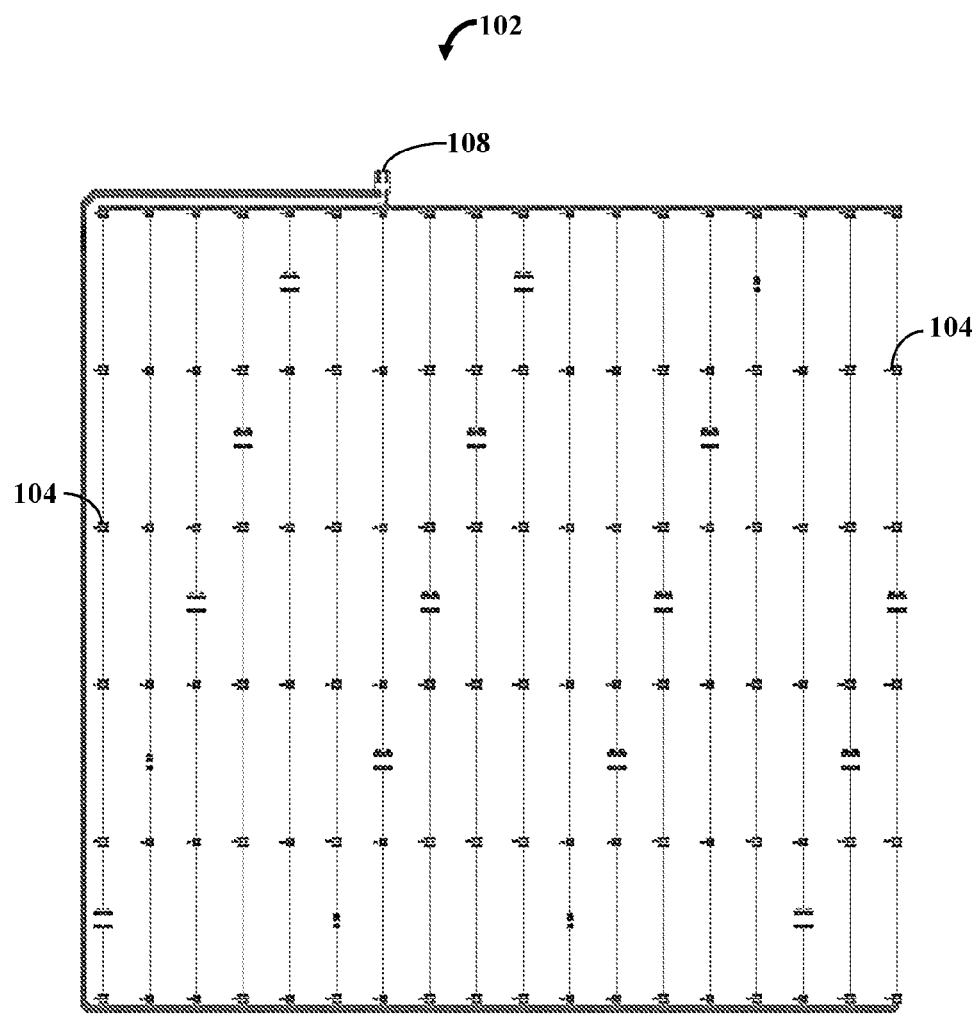
FIG. 6 exemplarily illustrates a printed circuit board showing an array of light sources embedded on the printed circuit board.

FIG. 6 exemplarily illustrates a printed circuit board 102 showing an array of light sources 104 embedded on the printed circuit board 102. In an embodiment, the printed circuit board 102 of a wavelength emitting electronic device 100 houses one hundred and eight high powered light sources 104 within its aluminum printed circuit board 102 (PCB) panel, each light source 104 outputs roughly (516 mA) of power individually. The individual light sources 104 have predetermined values correlating with chemical composition by specific wavelength frequencies. These predetermined wavelengths create photomorphogenesis by triggering photoreceptors in the target plants to collect and use the energy carried within the light. Wavebands constitute molecular development and induce very specific results influencing the overall attributes related to the size, shape and production of fruiting and flowering plants. Plants essentially are transformed by the environment, which is provided to them. The wavelength emitting electronic device 100 draws power from the circuit rectification module power source 108, which performs efficiently under well-managed heat plans. In an embodiment, the wavelength emitting electronic device 100 creates thermal conduction, channeling heat outward away from components through its supporting frame member 101. Although the operating temperature of a wavelength emitting electronic device 100 runs cool enough to touch with one's hand, they still generate a moderate amount of heat in a confined space. Thus, additional heat dissipating through use of any basic osculating fan to maintain correct temperature within the environment is recommended. The wavelength emitting electronic device 100 provides maximum opportunity to excite the molecular reaction known as P700 & P680, which are the fundamental reactions for photosynthesis to occur. The printed circuit board 102 (PCB) encompasses three primary wavelengths, each producing potential light-absorption rates above the seventy-five percentile rage; additionally the volume of each wavelength is proportioned and segregated. This allows the plant to be somewhat designed, and circumstantially the plant or seed has no alternative to an additional source or light energy and thus must adapt to its environment.

Figure 7:
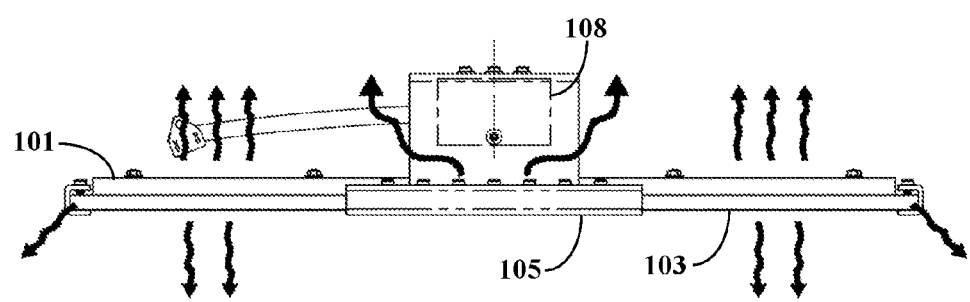
FIG. 7 exemplarily illustrates a thermal transfer diagram of a wavelength emitting electronic device.

FIG. 7 exemplarily illustrates a thermal transfer diagram of a wavelength emitting electronic device 100. As disclosed in the detailed description of FIG. 6, heat is generated by the printed circuit board 102 of the Wavelength emitting electronic device 100. A portion of this heat is transferred directly into the environment via the other components of the wavelength emitting electronic device 100. The supporting frame member 101 helps transfer heat directly to the environment. Similarly, each component of the wavelength emitting electronic device 100 does its respective part to help with transferring and absorbing heat as exemplarily illustrated in FIG. 7. The PCB 102 is the main heat source of the Wavelength emitting electronic devices 100. In an embodiment, the PCB 102 is made of aluminum of about 3 mm thickness. Each of the components is mounted directly onto a circuit trace of the PCB 102. As used herein, a "circuit trace" refers to small lines of an electrically conductive printed material, for example, copper, aluminum, etc., that connect each of the components, for example, light emitting diodes, resistors, etc., on a PCB. The dialectic and non-dialectic properties are separated with a silkscreen and painting process that allows the entire surface to be used as a solid-state thermal transferring device or heat sink. As no additional cooling devices are required to be secured to each independent component, one can increase density and placement of high heat generating electronic components to a smaller application. Variation of materials and thickness used are scaled to accommodate individual applications. The circuit rectification module power source 108 also generates heat, which is partially absorbed by the supporting frame member 101. The remaining heat generated by the circuit rectification module power source 108 and other components are transferred to the environment as exemplarily illustrated in FIG. 7.

FIG. 8 exemplarily illustrates a table showing characteristics of the different wavelengths used in a wavelength emitting electronic device 100. The energy potential of a waveband at 670 nm is about 178.55 KJ/mole and is supplied by about 84 LEDs of the wavelength emitting electronic device 100. The energy potential of a waveband at 485 nm is about 246.65 KJ/mole and is supplied by about 12 LEDs of the wavelength emitting electronic device 100. The energy potential of a waveband at 465 nm is about 257.26 KJ/mole and is supplied by about 12 LEDs of the wavelength emitting electronic device 100. The ratio of independent wavebands associated is a direct reflection on the desired photoreceptors one is trying to stimulate. Hence, a mathematical formula can be used to accomplish altering the effective areas of plant physiology with moderate adjustments of individual wavebands and number of components emitting those wavebands. The wavelength emitting electronic device 100 can be modified to suit any individual phases of photo stimulation beneficial to organisms by use of segregated wavebands distribution.

FIG. 9 exemplarily illustrates a table showing plants that have been successfully grown using a wavelength emitting electronic device 100.

The foregoing examples have been provided merely for the purpose of explanation and are in no way to be construed as limiting of the wavelength emitting electronic device 100, disclosed herein. While the wavelength emitting electronic device 100 has been described with reference to various embodiments, it is understood that the words, which have been used herein, are words of description and illustration, rather than words of limitation. Further, although the wavelength emitting electronic device 100, has been described herein with reference to particular means, materials, and embodiments, the wavelength emitting electronic device 100 is not intended to be limited to the particulars disclosed herein; rather, the wavelength emitting electronic device 100 extends to all functionally equivalent structures, methods and uses, such as are within the scope of the appended claims. Those skilled in the art, having the benefit of the teachings of this specification, may effect numerous modifications thereto and changes may be made without departing from the scope and spirit of the wavelength emitting electronic device 100 disclosed herein in their aspects.

What is claimed is:

1. A wavelength emitting electronic device for manipulating a plurality of plant growth via restricted spectral output of individual wavelengths to target chemical excitation within chlorophyll molecules in chloroplast, the wavelength emitting electronic device comprising:
    a supporting frame member comprising a first surface and a second surface, the first surface is detachably attached to the second surface, wherein the second surface is configured to support two or more wavelength emitting electronic device components as a single unit, providing thermal transference via thermal conduction;
    at least one printed circuit board, comprising an array of light sources, wherein the light sources are light emitting diodes (LEDs), detachably attached to the second surface, wherein the each light source of the array of light receive electrical signals from an external power source mounted to the second surface, wherein the each light source of the array of light sources emits monochromatic light of predetermined wavelengths comprising:
        670 nm at 178.55 KJ/mole produced individually by 84 LEDs at 500 mA power supply;
        485 nm at 246.65 KJ/mole produced individually by 12 LEDs at 500 mA power supply;
        465 nm at 257.26 KJ/mole produced individually by 12 LEDs at 500 mA power supply,
    triggering a photomorphogenesis within multiple photoreceptors in the chloroplast to absorb the energy carried within the light for manipulation of a plurality of plants growth at every stage of the life-cycle, and
    an optically transmittive material fixedly attached to the second surface for transmitting the light emitted by the array of light sources to the plants for manipulating a plurality of plant growth via restricted spectral output of individual wavelengths to target chemical excitation within chlorophyll molecules in the chloroplast.

2. The wavelength emitting electronic device of claim 1, wherein the optically transmittive material and the at least one printed circuit board are attached to the second surface via a plurality of clamping members.

3. The wavelength emitting electronic device of claim 1, wherein the power source is a detachably attached circuit rectification module power source.

4. The wavelength emitting electronic device of claim 1, wherein the optically transmittive material is a heat resistant glass material.

5. The wavelength emitting electronic device of claim 1, wherein the light source is any one of surface mount technology (SMT) light emitting diodes and organic light emitting diodes.

6. The wavelength emitting electronic device of claim 1, wherein the light source is a combination of surface mount technology (SMT) light emitting diodes and organic light emitting diodes.

* * * * *